United States Patent
Prigge

(10) Patent No.: US 6,549,004 B1
(45) Date of Patent: Apr. 15, 2003

(54) DISTRIBUTED MAGNETIC FIELD POSITIONING SYSTEM USING CODE DIVISION MULTIPLE ACCESS

(75) Inventor: Eric A. Prigge, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 78 days.

(21) Appl. No.: 09/809,999

(22) Filed: Mar. 14, 2001

Related U.S. Application Data

(60) Provisional application No. 60/189,208, filed on Mar. 14, 2000.

(51) Int. Cl.$^7$ .................................................. G01B 7/14
(52) U.S. Cl. ......................... 324/207.17; 324/207.22; 324/207.23
(58) Field of Search ....................... 324/207.12, 207.18, 324/207.17, 207.11, 207.15, 225, 207.26, 247, 147, 244, 227, 207.23, 207.22; 342/450, 451, 463, 448, 443; 343/895, 867; 318/16, 647; 702/94, 150, 153

(56) References Cited

U.S. PATENT DOCUMENTS

| | | | |
|---|---|---|---|
| 3,581,191 A | * 5/1971 | Anderson | 324/310 |
| 3,711,764 A | * 1/1973 | Ernst | 324/312 |
| 3,868,565 A | 2/1975 | Kipers | 324/207.26 |
| 3,983,474 A | 9/1976 | Kuipers | 324/207.18 |
| 4,054,881 A | 10/1977 | Raab | 342/448 |
| 4,849,692 A | 7/1989 | Blood | 324/207.26 |
| 4,945,305 A | 7/1990 | Blood | 324/207.17 |
| 5,307,072 A | 4/1994 | Jones, Jr. | 342/147 |
| 5,453,686 A | 9/1995 | Anerson | 324/207.17 |
| 5,600,330 A | 2/1997 | Blood | 342/463 |
| 5,640,170 A | 6/1997 | Anderson | 343/895 |
| 5,767,669 A | 6/1998 | Hansen et al. | 324/207.12 |
| 5,956,250 A | * 9/1999 | Gudat et al. | 364/424.031 |
| 6,172,499 B1 | 1/2001 | Ashe | 324/207 |

* cited by examiner

*Primary Examiner*—Edward Lefkowitz
*Assistant Examiner*—Reena Aurora
(74) *Attorney, Agent, or Firm*—Lumen Intellectual Property Services, Inc.

(57) ABSTRACT

An apparatus and methods for a magnetic field positioning system use a fundamentally different, and advantageous, signal structure and multiple access method, known as Code Division Multiple Access (CDMA). This signal architecture, when combined with processing methods, leads to advantages over the existing technologies, especially when applied to a system with a large number of magnetic field generators (beacons). Beacons at known positions generate coded magnetic fields, and a magnetic sensor measures a sum field and decomposes it into component fields to determine the sensor position and orientation. The apparatus and methods can have a large 'building-sized' coverage area. The system allows for numerous beacons to be distributed throughout an area at a number of different locations. A method to estimate position and attitude, with no prior knowledge, uses dipole fields produced by these beacons in different locations.

23 Claims, 7 Drawing Sheets

DISTRIBUTED MAGNETIC FIELD POSITIONING SYSTEM USING CODE DIVISION MULTIPLE ACCESS

CROSS-REFERENCE TO RELATED APPLICATIONS

This application claims the benefit of U.S. Provisional Application No. 60/189,208, filed Mar. 14, 2000, herein incorporated by reference.

STATEMENT REGARDING FEDERALLY SPONSORED RESEARCH OR DEVELOPMENT

This invention was supported in part by contract number NCC2-333 from the National Aeronautics and Space Administration (NASA). The U.S. Government has certain rights in the invention.

FIELD OF THE INVENTION

This invention relates generally to positioning systems. More particularly, it relates to a system and methods for estimating the position and attitude (orientation) of a remote object through the measurement of magnetic fields generated by beacons.

BACKGROUND OF THE INVENTION

1. Motivation

Accurate sensing of the position and attitude of an object is a fundamental requirement in many applications, but is a challenging problem in the cluttered and unstructured environment of the real world. As an example application, mobile robots require position and attitude information to perform redundant or dangerous tasks, such as warehouse automation, floor sweeping, delivery of parts in factories, courier service in offices, or even inspection around the International Space Station. Other applications requiring a positioning system include personnel tracking, such as in military or police training exercises, object tracking, virtual reality, or motion capture for movie effects or animation.

Numerous sensing technologies have been developed to provide the position information required in these applications. Many existing positioning systems are limited in workspace and robustness because they require clear lines of sight or do not provide absolute (drift-free) measurements. For example, overhead cameras have been used to track infrared LEDs on mobile robots. The result is millimeter-level position accuracy, but clear lines of sight must be maintained between cameras and robots. Landmark vision techniques, building-fixed acoustic systems, and RF-based systems also generally require unobstructed lines of sight. Systems based on inertial sensors or wheel encoders avoid line of sight issues, but their measurements are not absolute and are subject to error accumulation. Many on-board vision and laser rangefinder techniques also accumulate error as the robot travels. These restrictions limit the workspace and robustness of a mobile robot in the real factory or warehouse environment.

Positioning systems based on magnetic fields offer an important alternative by providing absolute position and attitude information with the potential for no 'line of sight' restrictions.

2. Background Art

Magnetic field positioning systems use electrical current running through wires (referred to herein as 'beacons') to create magnetic fields. Magnetic fields obey superposition and therefore simply add as vectors. A remote sensor unit measures the sum magnetic field at its location. This sum magnetic field is a vector and has 3 independent components. For the sensor to determine its position and attitude (6 quantities), it must have more information than just the sum field. The sensor must have some way of determining the magnetic field due to an individual beacon or combination of beacons. In other words, the sensor must be able to distinguish the portion of the sum field that is produced by an individual beacon or combination of beacons. For example, if the sensor can determine the magnetic field produced by one beacon (3 measured quantities) and can also determine the magnetic field due to a second beacon (another 3 quantities), it may be possible to solve for position and orientation. Methods for distinguishing signals are known as 'multiple access' methods.

Existing magnetic field positioning systems use signal structures that fall into two categories, 'AC' fields or 'pulsed DC' fields.

In 'AC' systems, described in U.S. Pat. No. 3,868,565 (Kuipers) and U.S. Pat. No. 4,054,881 (Raab), the magnetic fields are sinusoidal in nature. Beacons produce fields at different frequencies, and frequency filtering is used by the remote sensor to distinguish the fields from individual beacons. Example waveforms for 3 beacons are shown in FIG. 1. This multiple access technique is known as Frequency Division Multiple Access (FDMA).

In 'pulsed DC' systems, described in U.S. Pat. No. 4,849,692 (Blood), U.S. Pat. No. 4,945,305 (Blood), and U.S. Pat. No. 5,453,686 (Anderson), the magnetic fields are generated in pulses. Example waveforms for 3 beacons are shown in FIG. 2. In this example, discrimination of the field due to a particular beacon is straightforward—only one beacon is producing a field at a given time. This multiple access method, in which a beacon produces fields during some 'time slots' and not during others, is known as Time Division Multiple Access (TDMA).

Further refinements to these magnetic field positioning systems are described in U.S. Pat. No. 5,640,170 (Anderson), where magnetic fields are created from a special anti-distortion source configuration, and U.S Pat. No. 5,600,330 (Blood), which can function with non-dipole fields. Eddy currents are a common error source in magnetic field systems, and methods to reduce this error are described in U.S Pat. No. 5,767,669 (Hansen et al) for 'pulsed DC' systems and U.S. Pat. No. 6,172,499 (Ashe) for 'AC' systems. Methods typically involve complicated schemes for detecting and removing effects of eddy currents on the computed signal.

3. Limitations of the Current State of Technology

Existing magnetic field positioning systems use signal structures and multiple access methods that are sub-optimal, especially when applied to a system with a large number of beacons. Improvements in accuracy, uniformity of coverage, sensor complexity, and magnetic field levels are still desirable for many applications.

Further, existing magnetic field positioning systems are generally based on fields created in one location, typically by 3 concentric beacons, giving 'room-sized' coverage areas. A much larger 'building-sized' coverage area could be provided if many beacons, perhaps hundreds or thousands, could be distributed at numerous locations throughout an entire area. A challenge that arises, however, is the processing method to estimate position and attitude given magnetic fields produced by beacons in multiple locations. The equations used to solve for position and attitude are nonlinear, and do not converge to a solution using standard techniques unless a good estimate of position and attitude is already known.

SUMMARY OF THE INVENTION

The present invention provides an apparatus and methods for a magnetic field positioning system to use a fundamentally different, and advantageous, signal structure and multiple access method, known as Code Division Multiple Access (CDMA). The apparatus contains a plurality of beacons at known positions and orientations, each generating a magnetic field that varies according to a pseudorandom code. A magnetic sensor produces magnetic field measurements that are analyzed by a processor to discriminate the fields produced by individual beacons and determine the position and attitude of the sensor. The beacons can also have their own sensors and processors to determine their relative positions. The magnetic sensor is typically fixed to an object whose position is being monitored.

The present invention also provides a method for estimating the position and attitude of a magnetic sensor, including the following steps: using a set of beacons, generating a plurality of magnetic fields at known beacon positions and orientations; measuring a sum magnetic field at a sensor position; and analyzing the magnetic field measurements to estimate a position and attitude of the sensor. The generated magnetic fields vary according to mutually orthogonal pseudorandom codes. Analysis includes correlating the magnetic field measurements with the codes and correcting for cross-correlation among codes.

This CDMA signal architecture, when combined with processing methods, leads to numerous advantages over the existing technologies, especially when applied to a system with a large number of magnetic field generators (beacons). Advantages include:
- concentration of signal energy at lower frequencies, reducing eddy current noise and increasing accuracy;
- CDMA 'processing gain' increases signal to noise ratio, increasing accuracy;
- uniform coverage;
- sensor unit less complex and easier to tune;
- lower usable signal levels.

Further, the present invention provides an apparatus and methods for a magnetic field positioning system to have a large 'building-sized' coverage area. The system allows for numerous beacons to be distributed throughout an area at a number of different locations. This invention includes a method to estimate position and attitude, with no prior knowledge, using dipole fields produced by these beacons in different locations. An increase in the number of beacons can also provide advantages of increased robustness, better measurement geometry, and increased accuracy. Specifically, the estimation method includes measuring a magnetic field vector using a magnetic sensor; decomposing the vector into component vectors representing dipole fields generated by the beacons; calculating an approximate sensor position using the magnetic field magnitudes at the sensor; and using the approximate position to obtain a more accurate position of the sensor. The position is then used to estimate the attitude of the sensor.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention.

Overview and Advantages

In a first embodiment, the present invention provides an apparatus and methods for a magnetic field positioning system to use a fundamentally different, and advantageous, signal structure and multiple access method, known as Code Division Multiple Access (CDMA). Further, in a second embodiment, the invention provides an apparatus and methods to estimate position and attitude when beacons producing dipole fields are distributed throughout an area at a number of different locations.

Figure 1:
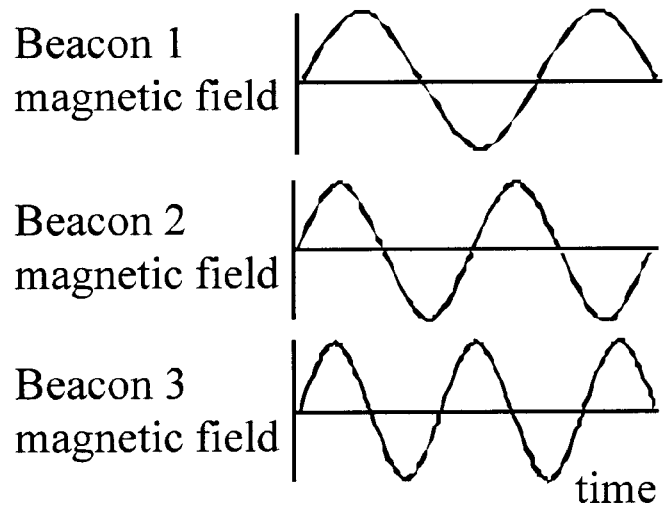
FIG. 1 is a plot showing magnetic fields created by 3 beacons in a prior art 'AC' system.
Figure 2:
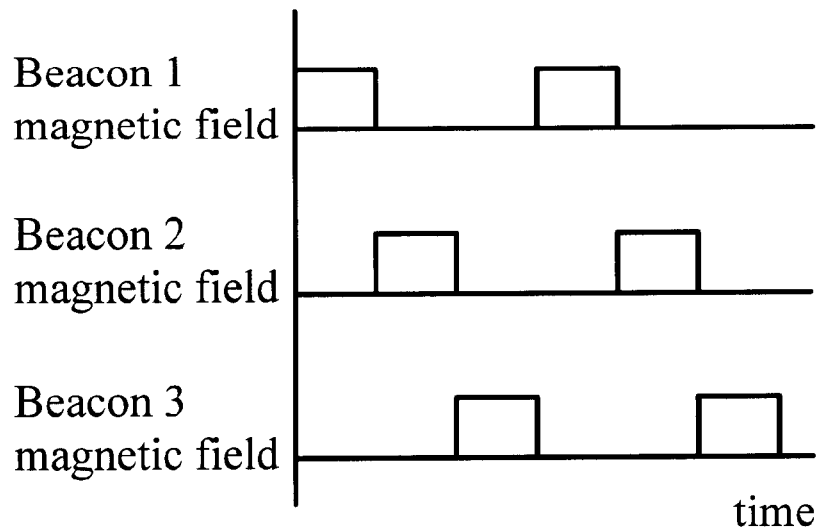
FIG. 2 is a plot showing magnetic fields created by 3 beacons in a prior art 'pulsed DC' system.
Figure 3A:
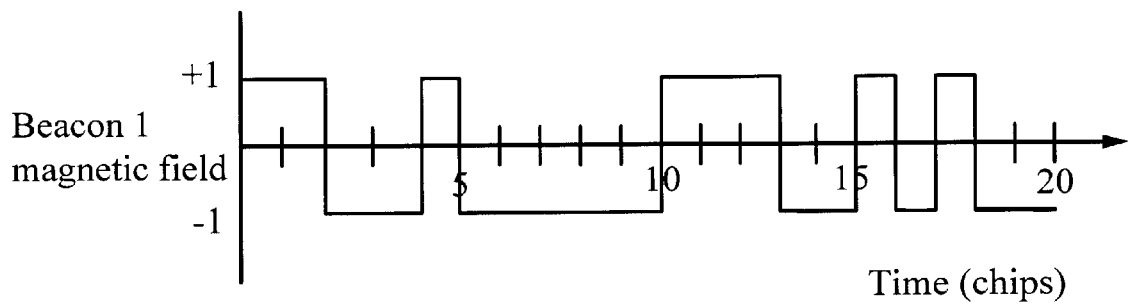
FIG. 3 is a plot showing magnetic fields created by 3 beacons using pseudorandom codes.
Figure 3B:
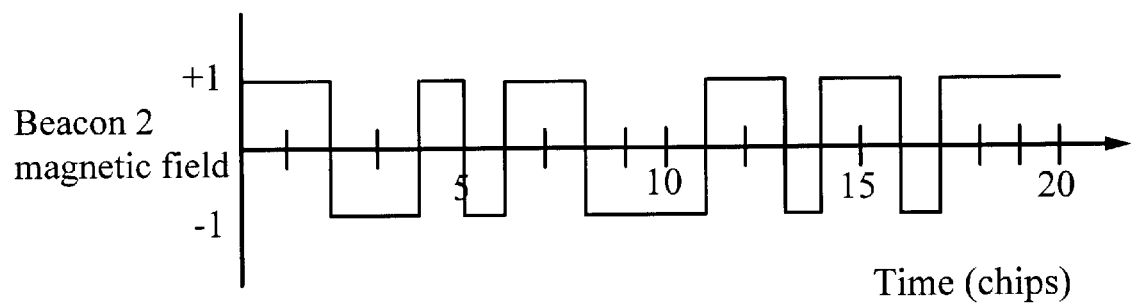
Figure 3C:
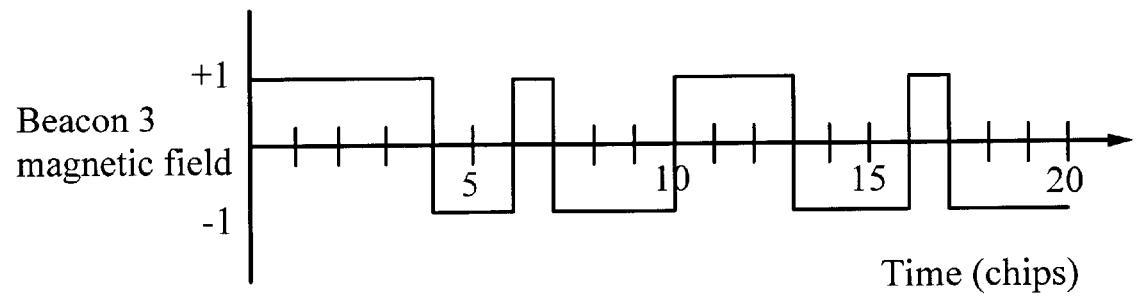

A. Magnetic Field Positioning System with a New Signal Structure and Multiple Access Method All beacons in this new type of magnetic field positioning system produce fields at all times. Each beacon, however, periodically changes the amplitude or direction of the electrical current creating its magnetic field. A change in direction is considered to be a change from positive to negative amplitude. As used herein, then, the term 'amplitude' includes changes in both amplitude and direction. Thus the magnetic field vector created by this beacon switches between two values. These changes occur according to a special binary sequence, called a 'pseudorandom code'. This code is usually represented as a sequence of 1's and −1's, with each element referred to as a 'chip'. An example of the magnetic fields created by 3 beacons is shown in FIGS. 3A–3C. The particular code sequences in FIGS. 3A–3C are 1023 chips long, so only a portion is shown. The partial code sequence that created the field in FIG. 3A is described by [1 1 −1 −1 1 −1 −1 −1 −1 −1 1 1 1 −1 −1 1 −1 1 −1 −1].

In a typical system, each beacon has its own unique code, and the codes of all beacons have the same length (number of chips). The beacons are typically synchronized so the chip transitions occur at the same time, and the codes repeat when their ends are reached. The pseudorandom codes are chosen from families of codes with good orthogonality properties. That is, the peak cross-correlation value of any two of these special vectors is small (compared to the peak autocorrelation of either vector). The codes used in the examples in FIGS. 3A–3C are called Gold codes. Information on the generation of these codes may be found in *Introduction to Spread Spectrum Communications,* Peterson, Ziemer, and Borth, Prentice-Hall, 2000.

A mobile sensor unit measures the sum magnetic field vector during each chip, storing measurements taken over a code cycle. The orthogonality of the codes allows the field strength from each individual beacon to be estimated through correlation. A correction is then applied to correct for the small cross-correlation between codes. The fields produced by different beacons have been distinguished, and with that knowledge the sensor may be able to estimate its position and attitude. This multiple access method is known as Code Division Multiple Access (CDMA).

Figure 4:
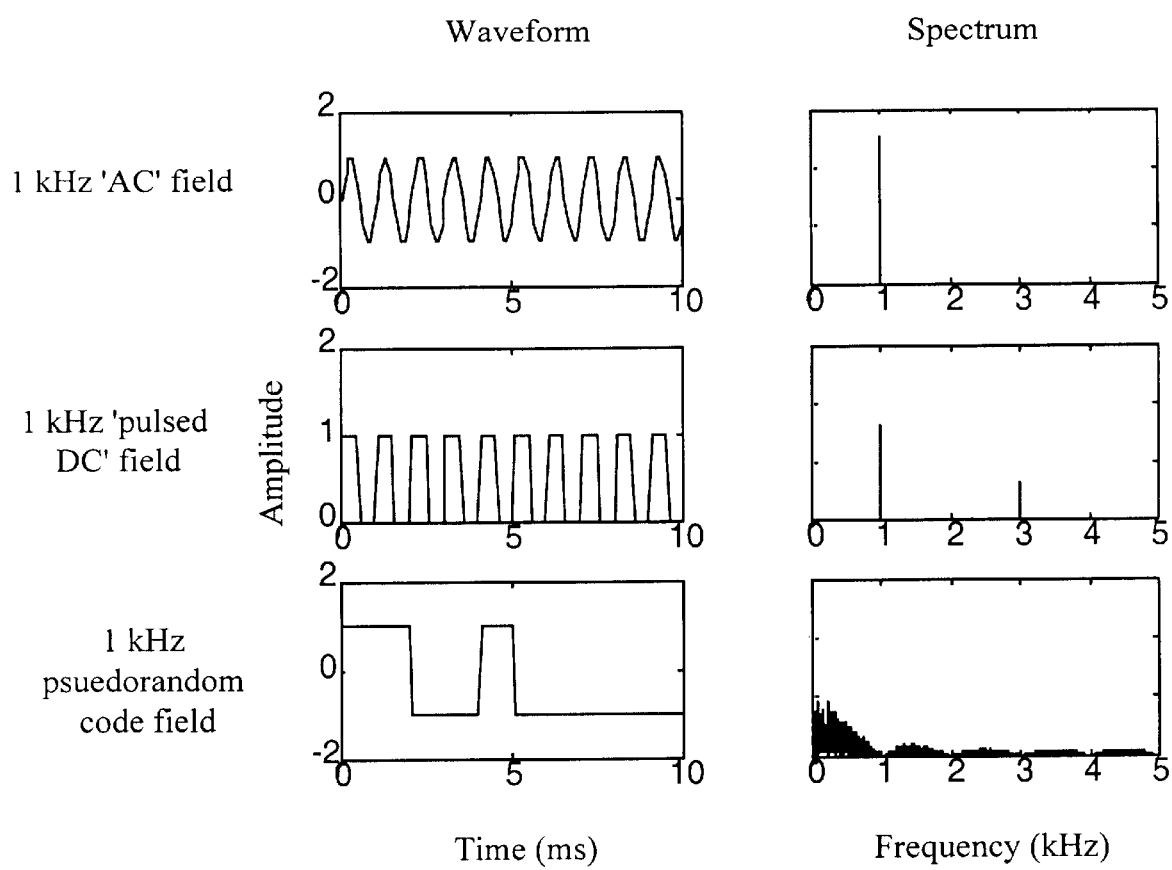
FIG. 4 shows plots of the waveform and spectra of 'AC' signals (prior art), 'pulsed DC' signals (prior art), and pseudorandom codes.

The signal structure (the waveform and spectrum) of this system is quite different from either the 'AC' or 'pulsed DC' fields of prior systems. FIG. 4 illustrates the waveform and spectrum of a 1 kHz sinusoid, as might be used in a prior art 'AC' system; the waveform and spectrum of a 1 kHz square wave, as might be used in a prior art 'pulsed DC' system with two coils; and the waveform and spectrum of a Gold code with a 1 kHz chip rate, used in the present invention. Differences between the systems, and corresponding advantages for the present invention, include:

The 1 kHz pseudorandom code has managed to concentrate a majority of its signal energy below 1 kHz, as shown in its spectrum. In contrast, the prior art spectra have no signal energy below 1 kHz. A common error source in magnetic field systems is distortion due to eddy currents. Since eddy currents are caused by the time rate of change of magnetic fields, the signal energy at lower frequencies proves to be an important advantage in reducing these distortions.

In a large system with many beacons, each beacon in a CDMA system has a unique code or code offset, but each beacon in an FDMA system uses a unique frequency. Analysis shows that even with very tight frequency spacing in the FDMA system, generously assuming the use of high order filters to resolve different frequencies in the sensor, most of the beacons in the FDMA system would be are at a much higher frequency than the beacons in the CDMA system. The CDMA system thus has an advantage over the FDMA system in overall eddy current noise, and this advantage grows with the number of beacons in the system.

Further, in the FDMA system with many beacons, the frequencies of individual beacons may be quite different. Thus the eddy current noise is not uniform over the coverage area—areas with lower frequency beacons have less noise than areas with higher frequency beacons. In the CDMA system, the spectrum is uniform from beacon to beacon.

Further, in the FDMA system with beacons at many different frequencies, the receiver must have filters to pass each of the frequencies while rejecting the others. The receiver may become very complex to design and difficult to tune. The CDMA system discriminates any number of beacons through correlation algorithms.

The CDMA system has another type of advantage known as 'processing gain'. As a simple illustration, consider a large distributed system of 100 beacons. In a TDMA system, each beacon generates a field during its individual 0.01 second 'time slot', and the whole system cycles through all the beacons each second. The sensor takes a measurement during each time slot, and the field strength of each beacon is based on one measurement. Note that during many of the time slots the sensor measures only noise as the system cycles through beacons far out of range. In a comparable CDMA system, all beacons create fields during each 0.01 second chip period. The correlation algorithm uses all 100 measurements to determine the field due to each beacon. Noise is averaged over many more samples. For additive white Gaussian noise (AWGN), the signal to noise ratio it, of the CDMA system is 10 times better than that of the TDMA system, in this example. The advantage due to processing gain is considerable for a CDMA system compared to a TDMA system. This advantage grows larger as the number of beacons in the system grows.

Processing gain mitigates even in-band noise. For example, in a TDMA system, a noise spike may cause a field strength estimate to be greatly in error. In a CDMA system, the noise spike is averaged to cause a much lower error. In an FDMA system, noise may occur at the same frequency as a beacon, and frequency filtering can not separate the noise from the signal. In a CDMA system, processing gain is effective against sinusoidal noise even in the bands of interest, which is particularly useful versus 60 Hz noise.

Processing gain also allows the CDMA system to use magnetic fields that are below the noise floor. This allows a CDMA system to operate at lower field levels. This may be beneficial for a magnetic field positioning system which covers a factory and is operating for long periods of time. Workers and electrical equipment (such as computer monitors) are exposed to lower field levels.

CDMA systems reject steady state magnetic fields, such as that due to the earth's magnetic field. TDMA systems may need to use one of their time slots to measure the ambient earth field with all beacons quiet. This slightly reduces the TDMA system signal to noise ratio.

B. Method to Estimate Position and Attitude with Beacons Distributed at Multiple Different Locations A magnetic field positioning system with a large coverage area is formed by distributing many beacons at numerous different locations throughout an area. The previous section described a signal structure and multiple access method that are very advantageous, especially with such large numbers of beacons. A challenge that remains, however, is the processing method to estimate position and attitude given magnetic field strengths from beacons in multiple locations. The equations used to solve for position and attitude are nonlinear, and do not converge to a solution using standard techniques unless a good estimate of position and attitude is already known. In a second embodiment, the present invention provides a method to solve for position and attitude, with no prior knowledge, using dipole magnetic fields produced by beacons at multiple locations.

For an example, consider a system containing eight beacons at eight various locations. The sensor has distinguished the fields due to each beacon. In this embodiment, it does not matter how the discrimination took place—perhaps the system uses AC fields, pulsed DC fields, or pseudorandom codes and correlation, as in the previous embodiment. The sensor thus has measured 24 quantities: 3 components of magnetic field vector for each of the 8 beacons. It may be possible to solve for the 6 unknowns: 3 components of position and 3 components of attitude.

The equations relating the 24 measurements and the 6 unknowns, however, are coupled and highly nonlinear. If the equations were linear, standard techniques would guarantee a solution, and even find the 'best' solution, providing certain conditions are met. For this set of nonlinear equations, however, application of standard techniques, such as multidimensional Newton iteration, fails to converge to a solution. Even with no noise, such as in a simulation, standard techniques fail to converge to a solution.

A computer-implemented method of the present invention to solve for position and attitude, given magnetic field measurements from beacons in multiple locations, requires no initial knowledge of position or attitude, and converges even in the presence of realistic noise.

The primary advantage of this method is that it allows beacons to be distributed in multiple locations. This allows a magnetic field positioning system to cover a large area. A further advantage of large numbers of beacons is redundancy and robustness to beacon failure. Another advantage is that more beacons can be applied in a given area to increase the number of measurements, with the goal of increasing the solution accuracy. Another advantage is that beacons may be located at positions which give a better measurement geometry. The concept of geometric dilution of precision is well known, and reference may be made to, for example, *Global Positioning System, Theory and Applications,* Parkinson, Spilker, Axelrad, Enge, American Institute of Aeronautics and Astronautics (AIAA), 1996, Vol. 1, p. 474.

Preferred Embodiments

A. Magnetic Field Positioning System with a New Signal Structure and Multiple Access Method In a first embodiment of present invention, an apparatus and methods are provided for a magnetic field positioning system using a fundamentally different, and advantageous, signal structure and multiple access method, known as Code Division Multiple Access (CDMA).

The system is used to estimate the position and orientation of a magnetic sensor in a reference coordinate frame. As used here, the term state refers to both position at a particular point in space in the reference coordinate frame, and attitude (orientation) of the sensor. Thus the sensor has a state vector with six components, three for position and three for attitude. Attitude can be described by many equivalent systems, including, but not limited to, Euler angles between the sensor coordinate system and the building-fixed coordinate frame; pitch, yaw, and roll angles; or direction cosine matrices.

Figure 5:
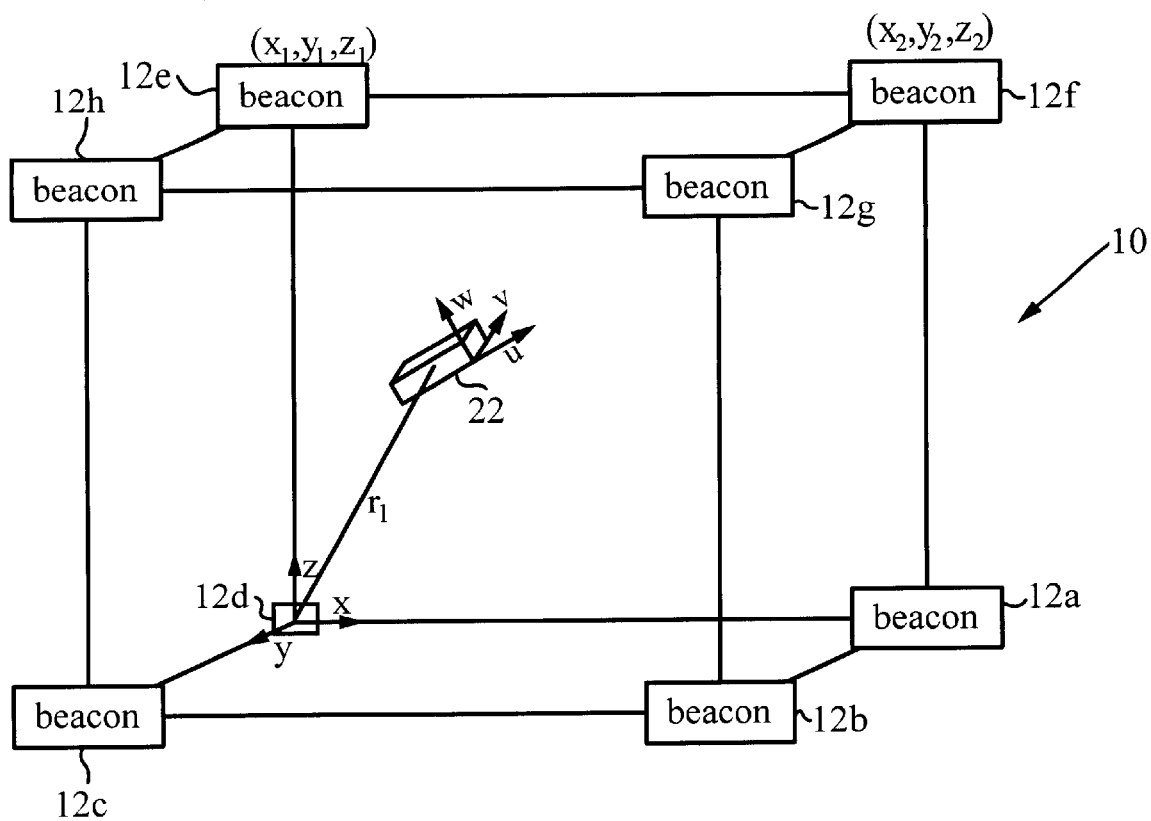
FIG. 5 is a schematic diagram of a magnetic field positioning system of the present invention with a number of beacons in different locations.

A position measurement system 10 of the present invention is shown in FIG. 5. Magnetic fields are generated by eight beacons 12a–12h positioned at the vertices of an imaginary cube. Beacon locations are specified in a Euclidean coordinate system as $(x_i, y_i, z_i)$, where i ranges from 1 to the total number of beacons. Beacons 12a–12h are equivalent and are all oriented with the longitudinal axis of their coils in the +z direction. Also shown is a mobile receiver or magnetic field sensor apparatus 22 that detects a sum magnetic field that is the vector sum of the individual magnetic fields generated by the beacons 12a–12h.

Figure 6:
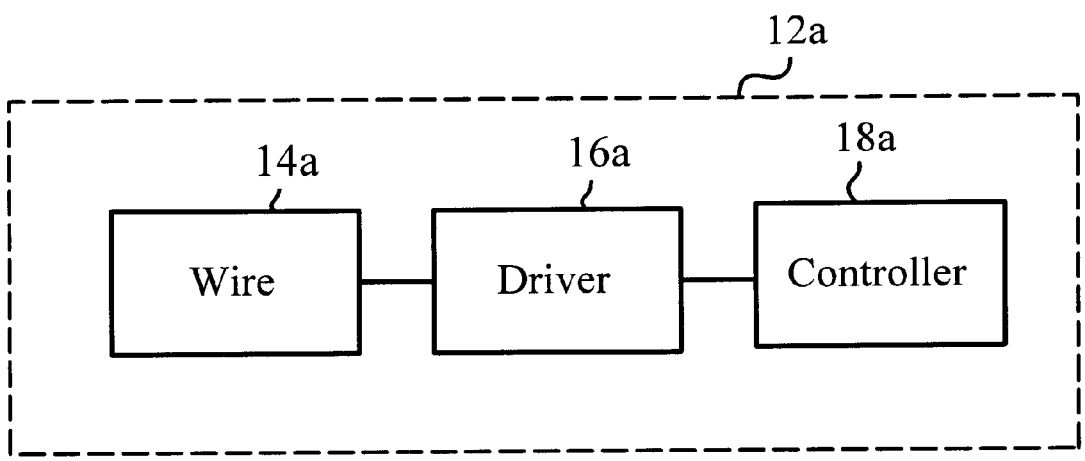
FIG. 6 is a schematic diagram of a magnetic field beacon of the system of FIG. 5.

As shown in FIG. 6, each beacon apparatus 12a consists of a wire 14a, a driver circuit 16a to drive electrical current through the wire 14a at various amplitudes, and a controller 18a to command the driver circuit 16a. If the wire 14a is wrapped as a coil, dipole magnetic fields are produced. Driver circuits to push current through the wire are readily available. An experimental prototype used commercially available stereo audio amplifiers. The controller 18a produces the pseudorandom code assigned to the beacon 12a. This code causes the driver 16a to force current through the wire 14a in such a way as to cause magnetic fields to assume the pseudorandom signal shape, as shown in FIGS. 3A–3C. A small microcontroller (semiconductor chip) was used to command the driver in an experimental prototype. The beacons 12a–12h are preferably linked together through a cable or wireless communication system so that timing information can be shared. This allows every beacon to transition to the next chip at the same time.

According to a method of the invention, all beacons produce magnetic fields at all times. Each beacon, however, periodically changes the amplitude or direction of the electrical current creating its magnetic field. These changes occur according to the substantially orthogonal, pseudorandom codes, such as the codes shown in FIGS. 3A–3C. In a typical system, each beacon has its own unique code, and the codes of all beacons have the same length (number of chips). The beacons are typically synchronized so that the chip transitions occur at the same time, and the codes repeat when their ends are reached.

As mentioned earlier, any pure DC offset to the current or magnetic field does not affect the system. Also, each beacon may actually use a superposition of two or more codes, including codes of different lengths at different chip rates. In this case, the sum magnetic field from the beacon switches among more than two values. Also, beacons in the same system may use the same code, but they must remain offset in time from each other.

Figure 7:
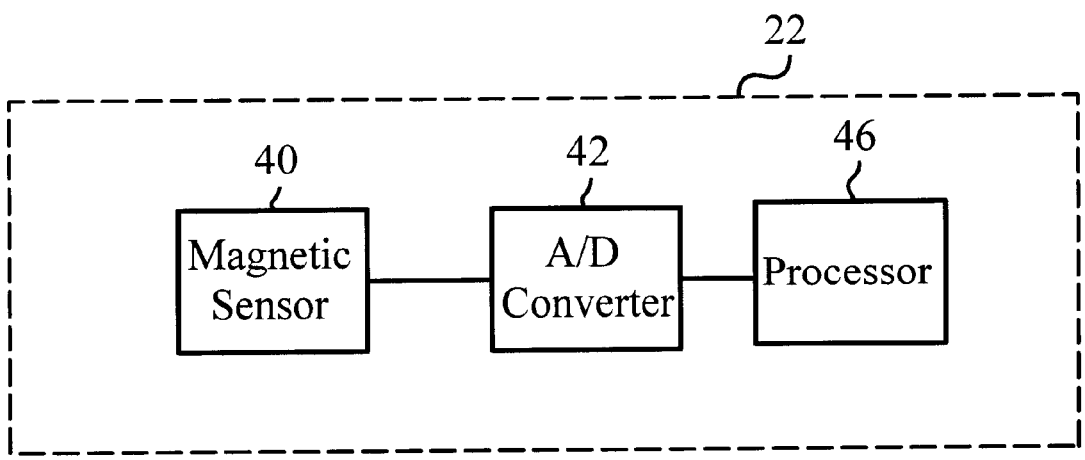
FIG. 7 is a schematic diagram of a sensor apparatus of the system of FIG. 5.

As shown in FIG. 7, the sensor apparatus 22 consists of a magnetic field sensor 40, an analog to digital (A/D) converter 42, and a processor 46. The magnetic field sensor 40, typically existing on semiconductor chips, measures the magnetic field vector. This is easiest if the sensor 40 can actually take measurements in each of 3 orthogonal directions. The A/D converter 42 takes the analog readings and makes them suitable for use by the digital processor 46. The processor 46 uses correlation algorithms to discriminate the field strength due to each beacon. A correlation correction is then applied to correct for the small cross-correlation between the substantially orthogonal codes.

Figure 8A:
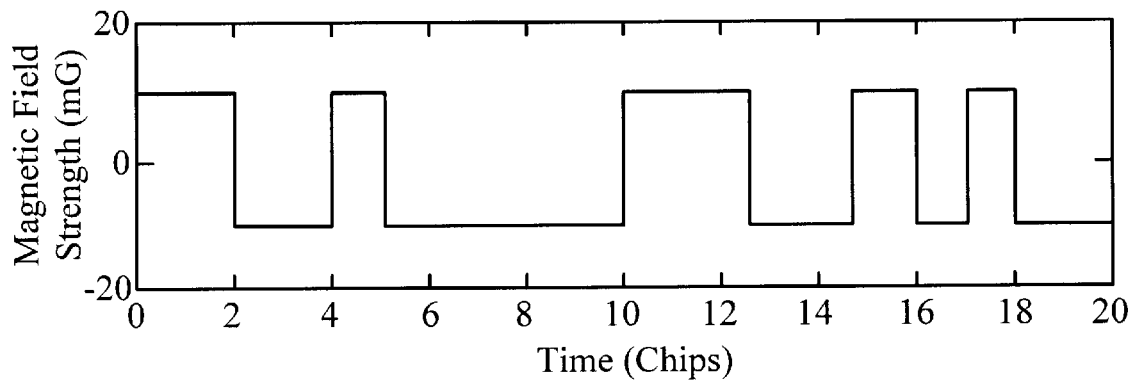
FIGS. 8A–8D are plots of magnetic field measurements taken in the presence of first, second, third, and all three beacons, respectively, each of which has a unique Gold code.
Figure 8B:
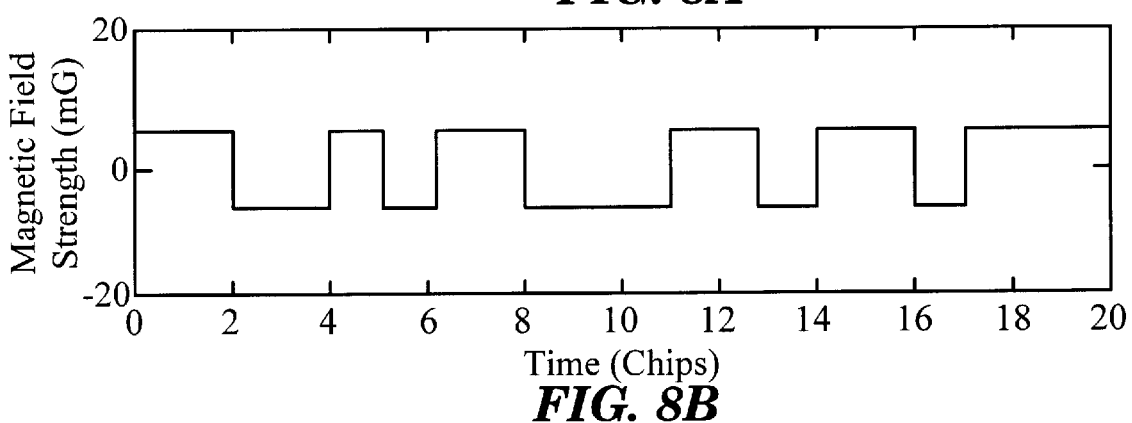
Figure 8C:
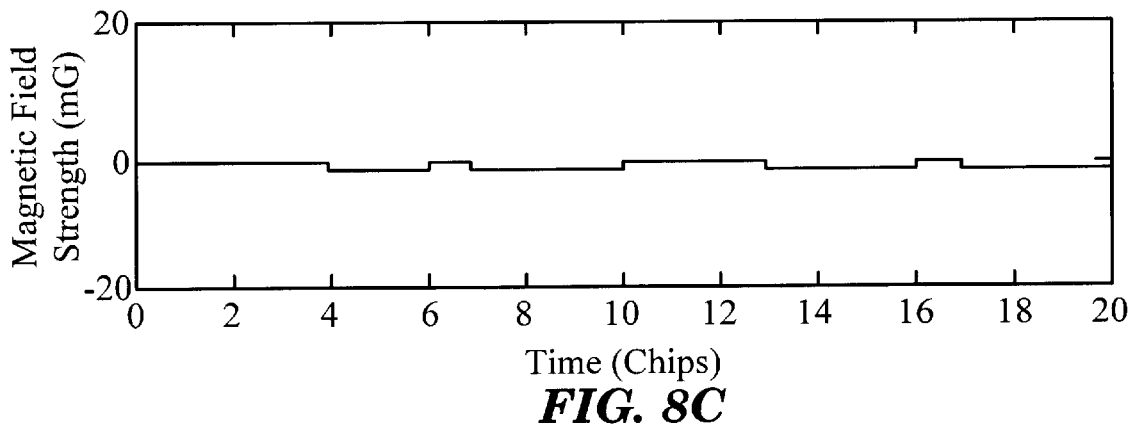

According to a method of the invention, the magnetic field measurements are processed using Code Division Multiple Access techniques. The orthogonality of the pseudorandom codes allows the field strength from each individual beacon to be estimated through correlation. An example of this follows, with reference to FIGS. 8A–8D. If beacon 1, using code sequence 1, were the only beacon producing a magnetic field, the sensor would record a magnetic field strength in some axis as shown in FIG. 8A, perhaps with some large steady state offset due to the earth's magnetic field. The field has an amplitude of 12 mG. If beacon 2, with code sequence 2, were the only active beacon, the sensor would record the magnetic field as shown in FIG. 8B. The amplitude is smaller (6 mG) because beacon 2 is located at a greater distance from the sensor than beacon 1. Similarly, the field recorded from beacon 3 (amplitude 1 mG) is shown in FIG. 8C. The sequences in this example are portions of Gold codes of length 1023.

Figure 8D:
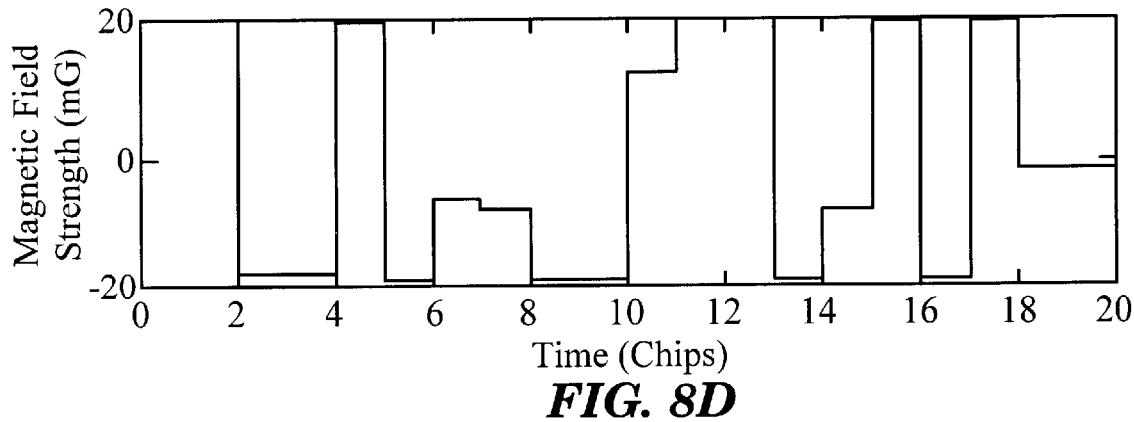

If all three beacons are active at the same time, the mobile sensor records the sum field, a portion of which is shown in FIG. 8D. This sum field also includes noise (not shown for clarity), perhaps of a magnitude even larger than the signals. In this example, 1023 measurements are taken, one during each chip in the code sequences. These measurements are denoted by a vector M. Processing requirements are least when the first element of the measurement vector is taken during the time the beacons are producing magnetic fields according to the first chip in their code sequences.

Correlation is used to distinguish the field produced by the $i^{th}$ beacon. First, the bias is subtracted from the measurement vector to eliminate any steady state offset, such as the earth's magnetic field. Then, the inner product is taken between the vector of measurements and the vector containing the code sequence for the $i^{th}$ beacon (a vector of 1's and −1's). The inner product is normalized by the length of the codes (in this case, 1023). The result, $B_i$, is an estimate of the field strength from the $i^{th}$ beacon. Thus $$B_i = C_i \cdot M / 1023, \quad \text{(Eqn. 1)}$$

where $C_i$=vector containing code sequence i;

M=measurement vector; and $B_i$=estimate of field strength from beacon i.

For the example in FIG. 8D, which shows measurements of a sum field, the result of this process is that $B_1$ is estimated to be 11.99, $B_2$ is 5.99, and $B_3$ is 0.98 (compare to actual value of of 12, 6, 1, respectively). From a noiselike measurement vector, estimates of the field strengths of each of the 3 beacons contributing to the magnetic field are obtained. The correlation process can operate on the measurement vector any number of times to estimate the field strength of any beacon. In a typical system, a measurement vector is obtained for each of the three orthogonal sensor axes. The correlation process is repeated for each axis, and the field strength for each beacon along each sensor axis is estimated.

The next step is to correct for the small cross-correlation between codes. This step is optional, because the correction is typically so small (e.g., few percent) that it is not necessary in many applications. The vector B contains the field strength estimates from n beacons of interest. An n by n correction matrix, A, is formed, where $$A_{ij} = C_i \cdot C_j \quad \text{(Eqn. 2)}$$

The matrix is symmetric, and the diagonal elements are 1's. The inverse of this matrix is multiplied by vector B, producing a new vector B' containing corrected estimates of the field strength due to each beacon. Once estimates of the field strength from each beacon are obtained, position and attitude estimates of the sensor can be estimated using techniques known in the art or techniques described below.

A magnetic field positioning system using this method, then, can distinguish pseudorandom fields produced by multiple beacons, providing the advantages described above.

For clarity, some simplifications have been made in the above description. The current and magnetic fields have been described as switching between two values, with zero half way between those values. However, any pure DC offset to the current or magnetic field does not affect the system. Thus, beacons may drive the magnetic field with changes in amplitude and/or direction, with the changes occurring according to pseudorandom codes. Also, each beacon may use a superposition of two or more codes, including codes of different lengths at different chip rates. The sum magnetic field from the beacon then switches among more than two values. Also, beacons in the same system can use the same code, but the codes must remain offset in time from each other. For example, one beacon is always 2 chips ahead of a second beacon using the same code.

B. Method to Estimate Position and Attitude with Beacons Distributed at Multiple Different Locations A magnetic field positioning system with a large coverage area (e.g., building wide) is formed by distributing many beacons at numerous different locations throughout an area. A challenge, however, is the processing method to estimate position and attitude given magnetic field strengths from beacons in multiple locations. The equations used to solve for position and attitude are nonlinear, and do not converge to a solution using standard techniques unless a good estimate of position and attitude is already known. In a second embodiment, the present invention provides an apparatus and method to solve for position and attitude, with no prior knowledge, using dipole magnetic fields produced by beacons at multiple locations.

The apparatus to form a magnetic field positioning system with a large coverage area consists of a plurality of beacons distributed at different, known locations throughout an area. The locations are referred to as significantly different from one another, meaning that the beacon separation distance is on the order of the separation between a beacon and the sensor. Thus the beacons are much more than slightly offset from one another. A beacon consists of a wire, a driver circuit to drive electrical current through the wire, and a controller to command the driver circuit. Thus the apparatus is similar to system 10 of FIG. 5. In this embodiment, however, the wire is wrapped as a coil so that dipole magnetic fields are produced. The apparatus also has a mobile sensor to sample the magnetic field vector. As with the previous embodiment, the sensor apparatus consists of a magnetic field sensor, an analog to digital (A/D) converter, and a processor.

Figure 9:
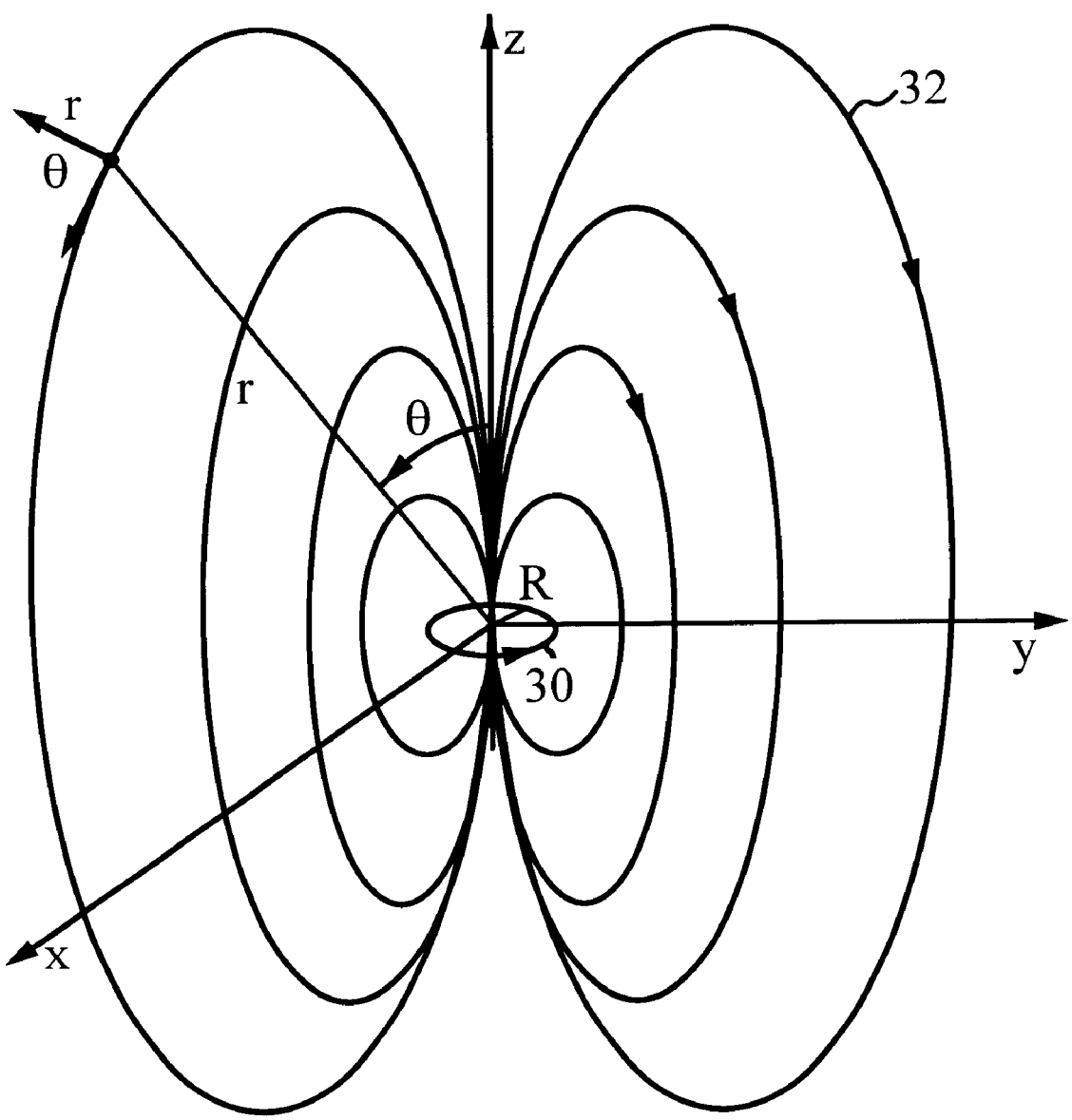
FIG. 9 is a schematic diagram of a dipole magnetic field created by a coil of wire.

As mentioned above, a magnetic field is created when electrical current flows through a wire. As shown in FIG. 9, a constant current flowing through a circular loop of wire 30 produces a constant magnetic field 32 called a dipole field. At a particular point, the vector magnetic field strength is given by (in spherical coordinates)

$$\vec{B} = \frac{\mu_0 N I a}{4\pi r^3}\left(2\cos(\theta)\hat{r} + \sin(\theta)\hat{\theta}\right) \quad \text{(Eqn. 3)}$$

where $\mu_0 = 4\pi \ast 10^{-3}$ G m/A (permeability of free space)

N=number of turns of wire

I=current $\theta$=elevation angle r=distance from center of loop

R=radius of loop a=area of loop=$\pi R^2$

This theoretical result is valid for points that are at a distance of several times the loop radius, i.e., for $|r| \gg R$. It also assumes that the total cross-sectional area of the wire itself is small compared to the loop radius R. Magnetic fields are measured in Gauss (G) or Tesla (T), with 1 T=$10^4$ G.

In this embodiment, the present invention provides a method to solve for position and attitude, with no prior knowledge, using dipole magnetic fields produced by beacons at multiple locations. This method will now be described, referencing the example system 10 in FIG. 5 for clarity.

System 10 in FIG. 5 has eight beacons 12a–12h at eight various locations. Sensor apparatus 22 distinguishes the fields due to each beacon using some method. In this embodiment, it does not matter how the discrimination took place; the system can use AC fields, pulsed DC fields, or pseudorandom codes and correlation according to the present invention. The sensor thus measures 24 quantities: 3 components of the magnetic field vector for each of the 8 beacons. These measurements are denoted by $B_{iu}$, the magnetic field due to beacon i along the sensor's u axis, $B_{iv}$, the magnetic field due to beacon i along the sensor's v axis, and $B_{iw}$, the magnetic field due to beacon i along the sensor's w axis.

The field measurements are used to determine position and orientation of the sensor. For the example case where all 8 beacons are oriented in the +z direction, the measurements are related to the position of the sensor by the following 24 equations:

$$B_{ix}=3k(x-x_i)(z-z_i)/r_i^5$$

$$B_{iy}=3k(y-y_i)(z-z_i)/r_i^5$$

$$B_{iz}=k(2(z-z_i)^2-(x-x_i)^2-(y-y_i)^2)/r_i^5 \quad \text{(Eqn. 4)}$$

where i=1 . . . 8 (beacon index)

$r_i=((x-x_i)^2+(y-y_i)^2+(z-z_i)^2)1/2$ x, y, z=sensor position $x_i$, $y_i$, $z_i$=position of beacon i $B_{ix}$, $B_{iy}$, $B_{iz}$=estimate of magnetic field created by beacon i (in x-, y-, or z-direction)

$k=\mu_0 NIa/4\pi$

Furthermore, note that these equations assume prior knowledge of orientation, so that the measured field strength vector can be written in a building-fixed (x, y, z) coordinate frame. Since attitude information is not known, further equations must be combined to relate the building-fixed coordinate frame to the (u, v, w) sensor coordinate frame. One method is to use a direction cosine matrix $$\begin{bmatrix} B_{iu} \\ B_{iv} \\ B_{iw} \end{bmatrix} = \begin{bmatrix} C_{11} & C_{12} & C_{13} \\ C_{21} & C_{22} & C_{23} \\ C_{31} & C_{32} & C_{33} \end{bmatrix} \begin{bmatrix} B_{ix} \\ B_{iy} \\ B_{iz} \end{bmatrix} \quad \text{(Eqn. 5)}$$

Equation sets 4 and 5 together relate the field strength measurements to the sensor position and attitude. They are coupled and highly nonlinear, and are referred to herein as the 'full vector equations'.

Given the 24 measurements (in this example) of magnetic field components and the beacon locations, it seems possible to solve these equations for the 6 components of sensor state. With no a priori knowledge of position, a standard iterated procedure (multidimensional Newton iteration) would be to arbitrarily pick a reasonable initial position, linearize about that point, and solve for the sensor position using weighted least squares. The process would iterate until the solution converges. However, due to the nonlinearity of these equations, if no a priori information is known about the position, standard algorithms do not converge to a solution.

A step towards a potential solution is to combine $B_{iu}$, $B_{iv}$, and $B_{iw}$ to form 8 magnitude equations. Because the magnitude of the vector is independent of whether it is measured in the sensor or building coordinate frames, the troubling rotation matrix has been eliminated. The resulting equations are:

$$|B_i|=k(3(z-z_i)^2+r_i^2)^{1/2}/r_i^4. \quad \text{(Eqn. 6)}$$

These equations can also be written in spherical coordinate form, resulting in further simplification $$|B_i|=k(1+3\cos^2\theta_i)^{1/2}/r_i^3, \quad \text{(Eqn. 7)}$$

where $\theta_i$ is the angle between the axis of the $i^{th}$ beacon and the vector from the $i^{th}$ beacon to the sensor, as shown in FIG. 9. Attitude information is not needed, and the system of equations has been reduced to 8 equations (for 8 beacons) and 3 unknowns (x, y, z). These are referred to herein as the 'full magnitude equations'. However, a standard iterated algorithm based on this system of equations again does not converge without good a priori knowledge of position.

A further step, though seemingly odd, overcomes the convergence problem. The 'full magnitude equations' are an accurate model relating the field strength to sensor position. However, a term will simply be changed, resulting in equations that are no longer accurate but do converge to a solution. Notice that the $(1+3\cos^2\theta)^{1/2}$ term in the equations is always between 1 and 2, and that the $1/r^3$ term dominates the equation. If the $(1+3\cos^2\theta)^{1/2}$ term is simply approximated as 1.5, then the resulting 'simple magnitude equations' are of the form $$|B_i|\approx 1.5k/r_i^3 \quad \text{(Eqn. 8)}$$

Eqns. 8 can be easily transformed to be of the same form as the pseudorange equations used, for example, in the Global Positioning System (without the bias terms), and these equations are well known to have very good convergence properties. Thus, an iterated algorithm based on 'simple magnitude equations' will converge without a priori knowledge of position, but not to the 'correct' solution (the solution that best solves the 'full magnitude equations'), due to the simplification step. However, simulation and experiment shows that, because the simplification does not affect the dominant $1/r^3$ term, the algorithm based on the 'simple magnitude equations' typically converges to a solution within 20 cm of the actual sensor position. Thus, the 'simple magnitude equations' can be used in a standard iterated algorithm to estimate a rough position solution without prior knowledge of position. This solution then provides an initial estimate for a standard iterated algorithm using the more precise 'full magnitude equations'.

Thus, with no prior estimate of position or orientation, the algorithm to estimate position given field strength measurements is as follows:

1) Combine $B_{iu}$, $B_{iv}$, and $B_{iw}$ into magnitude measurements. This decouples the position and attitude problems.

2) Use approximate 'simple magnitude equations' to find an initial estimate.

3) Use the initial estimate from step (2) as the starting point for solving the 'full magnitude equations'.

Notice that only magnitude equations are used in this algorithm to estimate position—attitude information is not required. Thus the position and attitude problems have been broken down into two steps. This allows simpler and less computationally expensive solutions.

Once an estimate of the position has been obtained, orientation can also be estimated. Using the estimate of position, the magnetic field strength at the sensor location due to the $i^{th}$ beacon, $B_i$, is calculated from Eqn. 3, with the result in building-fixed (x, y, z) coordinates. The same vector $B_i$ was also found in sensor coordinates (u, v, w) from the magnetic field measurements and some discrimination process. Thus, both 3×1 vectors in equation 3 are known. Eqn. 5 is written for each of the n beacons closest to the receiver, and the goal is then to solve for the (least squares optimal) rotation matrix (with elements $C_{ij}$) that relates these two vectors. This rotation matrix describes the attitude of the sensor with respect to the building-fixed coordinate frame.

This particular problem—estimating orientation—has a long history and well known algorithms for the solution. It was first posed by Wahba ("A Least Squares Estimate of Satellite Attitude," *SIAM Review*, Vol. 7, No. 3, p. 409, July 1965), motivated by the optimal estimation of the attitude of a satellite. A solution appeared in (Farrell, Stuelpnagel, "A Least Squares Estimate of Satellite Attitude," *SIAM Review, Vol.* 8, No. 3, p. 384, July 1966), and a bibliography of numerous improvements and modifications are referenced in (Markley, "Attitude Determination using Vector Observations and the Singular Value Decomposition," *Journal of the Astronautical Sciences,* Vol. 36, No. 3, p. 245, July–September 1988).

The elements of the direction cosine matrix, once estimated, contain all of the information needed to convert to other attitude representations, such as Euler angles.

Thus, a method has been presented which provides a method to solve for position and attitude, with no prior knowledge, using dipole magnetic fields produced by beacons at multiple locations.

It will be clear to one skilled in the art that the above embodiment may be altered in many ways without departing from the scope of the invention. Accordingly, the scope of the invention should be determined by the following claims and their legal equivalents.

What is claimed is:

1. An apparatus for determining a state of a magnetic sensor in a reference coordinate frame, wherein said state comprises position and attitude, said apparatus comprising:
   a) a plurality of beacons at known beacon positions and beacon orientations within said reference coordinate frame, each of said beacons generating a magnetic field whose amplitude varies according to a pseudorandom code, wherein said codes are substantially mutually orthogonal; and
   b) a processor in communication with said magnetic sensor for analyzing magnetic field measurements produced by said magnetic sensor to determine said state of said magnetic sensor.

2. The apparatus of claim 1, wherein each beacon comprises:
   i) a coil through which a current flows to generate a dipole magnetic field; and
   ii) a driver for supplying said current to said coil at a particular amplitude and/or direction, wherein said particular amplitude varies according to said pseudorandom code.

3. The apparatus of claim 1, further comprising a controller in communication with said beacons for supplying said codes to said beacons.

4. The apparatus of claim 1, wherein said beacons are in communication with one another to synchronize said codes.

5. The apparatus of claim 1 wherein said codes comprise Gold codes.

6. An apparatus for determining a state of an object in a reference coordinate frame, wherein said state comprises position and attitude, said apparatus comprising:
   a) a plurality of beacons at known beacon positions and beacon orientations within said reference coordinate frame, each of said beacons generating a magnetic field whose amplitude varies according to a pseudorandom code, wherein said codes are substantially mutually orthogonal;
   b) a magnetic sensor fixed to said object for measuring a total magnetic field generated by said beacons; and
   c) a processor in communication with said magnetic sensor for analyzing magnetic field measurements produced by said magnetic sensor to determine said state of said object.

7. The apparatus of claim 6, wherein each beacon comprises:
   i) a coil through which a current flows to generate a dipole magnetic field; and
   ii) a driver for supplying said current to said coil at a particular amplitude, wherein said particular amplitude varies according to said pseudorandom code.

8. The apparatus of claim 6, further comprising a controller in communication with said beacons for supplying said codes to said beacons.

9. The apparatus of claim 6, wherein said beacons are in communication with one another to synchronize said codes.

10. The apparatus of claim 6 wherein said codes comprise Gold codes.

11. A magnetic sensor position- and attitude-estimation method, comprising the steps of:
    a) using a plurality of beacons, generating a plurality of magnetic fields at known beacon positions and beacon orientations in a reference coordinate frame, wherein the amplitude of each generated magnetic field varies according to a pseudorandom code, wherein said codes are substantially mutually orthogonal;
    b) measuring a sum magnetic field at a sensor position to obtain a series of magnetic field measurements; and
    c) analyzing said magnetic field measurements to estimate a position of said sensor in said reference coordinate frame.

12. The method of claim 11 wherein step (b) occurs for a full code sequence, wherein a full code sequence comprises a predetermined number of code elements.

13. The method of claim 11 wherein step (c) comprises correlating said magnetic field measurements with said codes.

14. The method of claim 13 wherein step (c) further comprises correcting said estimated position to account for cross-correlations among said codes.

15. A method for determining a state of a magnetic sensor in a coverage area containing at least two beacons at known beacon locations and beacon orientations, wherein said state comprises position and attitude, each beacon generating a magnetic dipole field, said method comprising the steps of:
    a) measuring a magnetic field vector at a position of said sensor;
    b) decomposing said magnetic field vector into component vectors, each component vector representing one of said magnetic dipole fields;
    c) based on a magnetic field magnitude at said position of said sensor, calculating an approximate sensor position; and
    d) using said approximate sensor position as an initial position to determine said position of said sensor.

16. The method of claim 15 wherein at least two of said known beacon locations are different from each other.

17. The method of claim 16 wherein all of said known beacon locations are different from each other.

18. The method of claim 15 wherein said magnetic dipole fields are generated according to substantially mutually orthogonal pseudorandom codes.

19. The method of claim 15, further comprising the step of using said position to determine an attitude of said magnetic sensor.

20. A distributed apparatus for determining a state of a magnetic sensor in a reference coordinate frame, wherein said state comprises position and attitude, said apparatus comprising:
    a) a plurality of beacons at known beacon positions and beacon orientations within said reference coordinate frame, each of said beacons generating a magnetic field, whose amplitude varies according to a pseudorandom code, wherein the codes are substantially mutually orthogonal, wherein at least two beacon positions are significantly different from each other; and b) a processor in communication with said magnetic sensor for analyzing magnetic field measurements produced by said magnetic sensor to determine said state of said magnetic sensor.

21. The apparatus of claim 20 wherein all of said beacon positions are significantly different from each other.

22. The apparatus of claim 20 wherein said processor is configured to:

i) decompose said magnetic field measurements into component measurements, each component measurement representing one of said magnetic fields;

ii) based on a magnetic field magnitude at said position of said sensor, calculate an approximate sensor position; and iii) use said approximate sensor position as an initial position to determine said position of said sensor.

23. The apparatus of claim 22 wherein said magnetic fields are generated according to substantially mutually orthogonal pseudorandom codes, and wherein said processor is further configured to correlate said magnetic field measurements with said codes.

* * * * *